United States Patent
Takahashi et al.

(10) Patent No.: US 9,279,069 B2
(45) Date of Patent: Mar. 8, 2016

(54) DOUBLE-SIDED PRESSURE-SENSITIVE ADHESIVE SHEET AND METHOD FOR PRODUCING THE SAME

(75) Inventors: Akiko Takahashi, Ibaraki (JP); Mami Ikeya, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 1753 days.

(21) Appl. No.: 12/256,896

(22) Filed: Oct. 23, 2008

(65) Prior Publication Data

US 2009/0111343 A1 Apr. 30, 2009

(30) Foreign Application Priority Data

Oct. 26, 2007 (JP) .................. 2007-279268

(51) Int. Cl.
*B32B 27/12* (2006.01)
*C09J 7/04* (2006.01)

(52) U.S. Cl.
CPC .. *C09J 7/04* (2013.01); *C09J 7/045* (2013.01); *C09J 2201/128* (2013.01); *C09J 2201/622* (2013.01); *C09J 2400/263* (2013.01); *C09J 2401/006* (2013.01); *C09J 2433/00* (2013.01); *C09J 2497/006* (2013.01); *Y10T 442/2049* (2015.04)

(58) Field of Classification Search
CPC ........... B32B 27/12; B32B 38/00; B05D 5/10
USPC ......................... 442/149, 150, 151
See application file for complete search history.

(56) References Cited

U.S. PATENT DOCUMENTS

| | | | |
|---|---|---|---|
| 3,364,063 A * | 1/1968 | Satas ............................ | 442/151 |
| 3,908,650 A | 9/1975 | Dunshee et al. | |
| 4,906,421 A * | 3/1990 | Plamthottam et al. ........ | 264/471 |
| 6,706,129 B2 | 3/2004 | Ando et al. | |
| 2001/0006089 A1 | 7/2001 | Ando et al. | |
| 2004/0091689 A1* | 5/2004 | Tosaki et al. .................. | 428/214 |
| 2005/0233662 A1* | 10/2005 | Kimbrell et al. .............. | 442/149 |

(Continued)

FOREIGN PATENT DOCUMENTS

| | | |
|---|---|---|
| CN | 1498935 A | 5/2004 |
| EP | 1 418 213 A1 | 5/2004 |

(Continued)

OTHER PUBLICATIONS

Japanese Patent Office, Notice of Reasons for Refusal in Japanese Patent Application No. 2007-279268 (Sep. 6, 2012).

(Continued)

*Primary Examiner* — Peter Y Choi
(74) *Attorney, Agent, or Firm* — Leydig, Voit & Mayer, Ltd.

(57) ABSTRACT

Provided are a double-sided PSA sheet comprising a PSA layer formed by directly applying an aqueous dispersion-type PSA composition to a non-woven fabric substrate, wherein the layer has a highly smooth surface; and a method for producing the same. In this method, an aqueous dispersion-type PSA composition is applied to at least a first side of the non-woven fabric substrate and the composition is allowed to dry to form a PSA layer. A non-woven fabric of 15 μm to 70 μm in thickness, 0.3 to 0.6 g/cm³ in bulk density, and 0.7 sec to 2 sec in air resistance (Gurley) when measured for 8 layers the non-woven fabric substrate is used as the non-woven fabric substrate.

7 Claims, 2 Drawing Sheets

(56) References Cited

U.S. PATENT DOCUMENTS

2006/0083894 A1* 4/2006 Vetrovec et al. ............... 428/137
2007/0027554 A1* 2/2007 Biran et al. ................ 623/23.74

FOREIGN PATENT DOCUMENTS

| JP | 2001-152111 A | 6/2001 |
|----|---------------|--------|
| JP | 2002-356660 A | 12/2002 |
| JP | 2004-067875 A | 3/2004 |
| JP | 2004-155986 A | 6/2004 |
| JP | 3600637 B2 | 12/2004 |
| JP | 2006-143856 A | 6/2006 |
| JP | 3942301 B2 | 7/2007 |
| JP | 4043131 B2 | 2/2008 |
| JP | 4152049 B2 | 9/2008 |
| WO | WO 03/000814 A2 | 1/2003 |

OTHER PUBLICATIONS

Chinese Patent Office, First Notice of the Opinions on Examination in Chinese Patent Application No. 200810169106.9 (May 28, 2012).

Japanese Patent Office, Notice of Reasons for Refusal in Japanese Patent Application No. 2007-279268 (Nov. 20, 2014).

Chinese Patent Office, Second Notice of the Opinion on Examination in Chinese Patent Application No. 200810169106.9 (Nov. 1, 2012).

Chinese Patent Office, Third Notice of the Opinion on Examination in Chinese Patent Application No. 200810169106.9 (Feb. 20, 2013).

State Intellectual Property Office of the People's Republic of China, Notification of Reexamination in Chinese Patent Application No. 200810169106.9 (Mar. 23, 2015).

Chinese Patent Office, Final Rejection in Chinese Patent Application No. 200810169106.9 (Jun. 5, 2013).

Japanese Patent Office, Notice of Reasons for Refusal in Japanese Patent Application No. 2007-279268 (Jun. 26, 2014).

Japanese Patent Office, Notification of Submission of Information in Japanese Patent Application No. 2007-279268 (Jul. 4, 2013).

Japanese Patent Office, Notice of Reasons for Rejection in Japanese Patent Application No. 2007-279268 (Aug. 29, 2013).

* cited by examiner

DOUBLE-SIDED PRESSURE-SENSITIVE ADHESIVE SHEET AND METHOD FOR PRODUCING THE SAME

BACKGROUND OF THE INVENTION

1. Field of the Invention

The present invention relates to a double-sided pressure-sensitive adhesive (PSA) sheet, in which PSA layers formed of an aqueous dispersion-type PSA composition are retained by a non-woven fabric substrate, and a method for producing the same.

The present Application claims priority to Japanese Patent Application No. 2007-279268 filed on Oct. 26, 2007 and the entirety of the content of the Application is incorporated in this Specification by reference.

2. Description of the Related Art

Double-sided PSA sheets with a non-woven fabric substrate are widely used as a convenient and reliable means of joining in home appliances, automobiles and office automation equipments and various other fields. Conventional art related to this sort of double-sided PSA sheet is described in Japanese Patent Application Publication Nos. 2004-067875, 2002-356660, 2006-143856 and 2001-152111.

SUMMARY OF THE INVENTION

Thus far, in producing double-sided PSA sheets a solvent-type composition in which a PSA component (a polymer or the like) is dissolved in an organic solvent has been mainly used. Recently, however, due to environmental concerns and the desire to reduce the amounts of volatile organic compounds (VOCs) released from double-sided PSA sheets, an aqueous dispersion-type PSA composition in which a PSA component is dispersed in water tends to be preferred. Such conversion to an aqueous dispersion-type PSA composition has been tested in a variety of fields not limited to the PSA composition for a double-sided PSA sheet Current development is aimed at an aqueous dispersion-type PSA composition capable of providing adhesive performance equal to or greater than that of a solvent-type PSA composition.

PSA layers provided on double-sided PSA sheets with a non-woven fabric substrate are divided mainly into those prepared by directly applying (typically by coating) a fluid of a PSA composition to a non-woven fabric substrate and allowing the composition to dry or harden (direct method); and those prepared by adhering to a non-woven fabric substrate a PSA layer retained by a releasable backing (typically, a PSA layer formed by allowing a fluid of PSA composition applied to the backing to dry or harden) to transfer the PSA layer to the non-woven fabric substrate (transfer method). In general, a PSA layer prepared by transfer method has a smoother surface (on the side to be placed on an adherend) as compared to a PSA layer prepared by direct method and tends to exhibit better adhesive performance. In producing double-sided PSA sheets using aqueous dispersion-type PSA compositions, with an aim to adhesive performance equal to or greater than solvent-type PSA compositions as described above, PSA layers are often provided to both sides of the non-woven fabric substrate by transfer method.

While the transfer method requires a backing to retain a PSA layer until the PSA layer is transferred to a non-woven fabric substrate (hereinafter, this backing may be referred to as "transfer substrate"), the direct method does not require a transfer substrate and thus production costs and waste amounts can be reduced Furthermore, applying the direct method to the production of double-sided PSA sheets is of advantage in terms of productivity in manufacturing these sheets. Therefore, it will be useful to develop a way to form by direct method a PSA layer having a surface with reduced roughness (with high smoothness).

An objective of the present invention is to provide a double-sided PSA sheet having a PSA layer formed by direct method, the PSA layer having a highly smooth surface (on the adhesive side). Another objective of this invention is to provide a method suitable for producing this double-sided PSA sheet The present inventors investigated surface conditions of PSA layers formed by direct method to great degrees and discovered that air bubbles formed while drying PSA compositions provided on non-woven fabric substrates were a major cause of impaired surface smoothness. They discovered a way to suppress the formation of these air bubbles to complete this invention.

An invention disclosed herein is related to a method for producing a double-sided PSA sheet with a non-woven fabric substrate. This method comprises preparing an aqueous dispersion-type PSA composition. It also comprises preparing a non-woven fabric substrate. It further comprises forming a PSA layer by applying the PSA composition to at least one of the two sides of the non-woven fabric substrate and allowing the applied composition to dry. Here, the non-woven fabric substrate is selected so as to satisfy all of the following conditions: 15 µm to 70 µm in thickness; 0.3 to 0.6 g/cm$^3$ in bulk density; and 0.7 second to 2 seconds in air resistance (Gurley) when measured for 8 layers of the non-woven fabric substrate.

Conventionally, during the PSA-forming procedures where a PSA composition is directly applied to a non-woven fabric substrate (i.e., direct method), air bubbles are likely to form when the applied composition is allowed to dry; and these air bubbles tend to impair the surface condition (smoothness) of the resulting PSA layer. These air bubbles are considered to be formed mainly because when a PSA composition is applied, gas (typically air) present among strands of fiber is left (trapped) in the non-woven fabric substrate and the gas tries to escape to the outside when drying the composition. Marks of the escaped gas (air bubble marks) are left as dents on the PSA layer surface (typically semi-globular dents having near-circle openings) have been a major cause to impair the smoothness of PSA layers.

According to the method for producing a double-sided PSA sheet disclosed herein, using a specific non-woven fabric substrate that satisfies the above-described conditions leads to suppression of air bubble formation when the PSA composition applied to the non-woven fabric substrate is allowed to dry so as to form a PSA layer with a highly smooth surface. Providing a PSA layer by direct method to one or both sides of the non-woven fabric substrate brings about at least one positive effect of reduced production costs, reduced waste amounts and improved production efficiency. In addition, the use of an aqueous dispersion-type PSA composition is preferred for environmental health.

It is noted that the concept of "non-woven fabric" herein is directed mainly to a non-woven fabric used for preparation of PSA sheets in the field of PSA tapes and other PSA sheets. Typically, it refers to a non-woven fabric produced by a general paper making machine (it may be referred to as so-called "paper").

In one preferred embodiment of the method disclosed herein, a pre-formed PSA layer is laminated on a first side of the non-woven fabric substrate and the PSA composition is subsequently applied to a second side of the non-woven fabric substrate. In other words, a PSA layer is provided by transfer method to the first side of the non-woven fabric substrate and another PSA layer is provided by direct method afterwards to the second side (the back of the first side) of the non-woven fabric substrate. This embodiment is preferred in view of reduced production costs, reduced waste amounts, improved productivity and so on.

As the non-woven fabric substrate, those composed primarily of wood pulp fibers (typically those composed essentially of wood pulp fibers) can be preferably used. By using this sort of a non-woven fabric substrate, a double-sided PSA sheet can be produced to have both appropriate strength and flexibility. As the PSA composition, an aqueous emulsion-type PSA composition, comprising an acrylic polymer as a main component dispersed in water, can be used preferably.

The present invention provides a double-sided PSA sheet prepared by any one of the methods disclosed herein. This PSA sheet is preferred because the adhesive face formed by direct method is highly smooth.

Another invention disclosed herein is drawn to a double-sided PSA sheet with a non-woven fabric substrate. The non-woven fabric substrate meets all of the following conditions: 15 μm to 70 μm in thickness; 0.3 to 0.6 g/cm$^3$ in bulk density; and 0.7 second to 2 seconds in air resistance (Gurley) when measured for 8 layers the non-woven fabric substrate. The double-sided PSA sheet comprises a PSA layer formed by applying an aqueous dispersion-type PSA composition to the non-woven fabric substrate and allowing the applied composition to dry. In addition, the surface of the PSA layer is essentially free of macro-scale dents caused by air bubbles (marks of air bubbles described above). A double-sided PSA sheet in such a configuration is preferred because it has a highly smooth adhesive face formed by a process in which a PSA composition is applied directly to the non-woven fabric substrate (i.e., direct method). Preferred examples of the non-woven fabric substrate include non-woven fabric substrates composed primarily of wood pulp fibers. Preferred examples of the PSA compositions include aqueous emulsion-type PSA compositions containing acrylic polymer as a main component wherein the acrylic polymer is dispersed in water.

DETAILED DESCRIPTION OF THE INVENTION

Desirable embodiments of the present invention are explained below. Any matters which are necessary for implementing the present invention, but which are not particularly mentioned in these Specifications can be considered design matters for a person skilled in the art based on prior art in the technical field. The present invention can be implemented based on the content disclosed in these Specifications and on common knowledge in the technical field.

Figure 1:
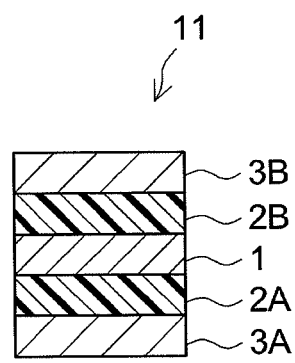
FIG. 1 shows a cross-section schematically illustrating a typical configuration of the double-sided PSA sheet.
Figure 2:
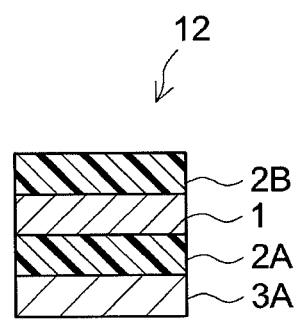
FIG. 2 shows a cross-section schematically illustrating another typical configuration of the double-sided PSA sheet.

The double-sided PSA sheet (which may be a long tape or the like) produced by applying the method of the present invention may, for example, have a cross-sectional structure such as shown schematically in FIG. 1 or FIG. 2.

A double-sided PSA sheet 11 shown in FIG. 1 is constructed such that PSA layers 2A and 2B are provided on both sides of a non-woven fabric substrate 1 and the PSA layers 2A and 2B are protected by release liners 3A and 3B, respectively, of which at least the side to contact the PSA layer is releasable. One or both of the PSA layers 2A and 2B are prepared by direct method in which a PSA composition is directly applied (typically by coating) to the non-woven fabric substrate 1. Preferably, one of the PSA layers 2A and 2B (for instance PSA layer 2B) is formed by direct method and the other layer is formed by transfer method. The transfer method, for instance, can be preferably carried out in such a way that the PSA layer 2A is preformed on the release liner 3A by applying (typically by coating) a PSA composition to the liner 3A and allowing the composition to dry; and the PSA layer 2A retained on the release liner 3A is adhered to the non-woven fabric substrate 1 (the PSA layer 2A is transferred to the non-woven fabric substrate 1). The release liner 3A used in the transfer method can be used as-is to protect the PSA layer 2A. Subsequently, the PSA layer 2B can be formed by direct method in which the PSA composition is applied to the other side of the non-woven fabric substrate 1 (the side opposite to the side having the PSA layer 2A) and allowed to dry; and the release liner 3B is placed on the PSA layer 2B to produce the PSA sheet 11 having a configuration shown in FIG. 1.

A double-sided PSA sheet 12 shown in FIG. 2 is provided with PSA layers 2A and 2B on both sides of the non-woven fabric substrate 1; and has a configuration such that the PSA layer 2A, which is one of those PSA layers, is protected by a release liner 3A releasable on the both sides. PSA sheet 12 of this sort may be rolled up so that the other PSA layer 2B is covered by the reverse side (back side) of the release liner 3A thereby to protect the PSA layer 2B with the release liner 3A as well. One or both of the PSA layers 2A and 2B are prepared by direct method in which a PSA composition is directly applied (typically by coating) to the non-woven fabric substrate 1. Preferably, one of the PSA layers 2A and 2B (for instance PSA layer 2B) is formed by direct method and the other layer is formed by transfer method. The transfer method can be preferably carried out in such a way that, as described above with respect to the PSA sheet 11 shown in FIG. 1, a PSA layer 2A preformed on the release liner 3A. The release liner 3A used in the transfer method can be used as-is to protect the PSA layer 2A. Subsequently, the PSA layer 2B can be formed by direct method in which the PSA composition is applied to the other side of the non-woven fabric substrate 1 and allowed to dry; and by rolling this up, can be produced a double-sided sided PSA sheet 12 (typically a tape) in which the double-sided PSA layers 2A and 2B are protected with the release liner 3A.

Forming both of the PSA layers 2A and 2B by transfer method requires a use of a transfer substrate (release liner and the like) to transfer the PSA layer 2B to the non-woven fabric substrate 1. This transfer substrate would be used only in the process of producing the product, but not as a component to constitute the product (PSA sheet 12). In the contrary, forming the PSA layer 2B by direct method does not necessitate the extra substrate to transfer the PSA layer 2B to the non-woven fabric substrate 1. Hence, the method for producing a double-sided PSA sheet according to the present invention can be preferably applied especially to the production of a double-sided PSA sheet such as the double-sided PSA sheet 12 shown in FIG. 2 where the reverse side (back side) of the release liner 3A protecting one of the PSA layers, 2A, is adhered to the other PSA layer, 2B; and may exhibit a desired effect (for instance, at least one effect of decreased production costs, decreased amount of wastes and increased production efficiency) better.

In FIGS. 1 and 2, interfaces between the non-woven fabric substrate 1 and the PSA layer 2A or 2B are shown as straight lines for simplification of the drawings. In reality, the non-woven fabric substrate 1 is impregnated with the PSA layers 2A and 2B at the interfaces (the sides touching the fabric). The compositions of the PSA layers 2A and 2B may be the same or different Typically, the PSA layers 2A and 2B are of the same composition. PSA compositions used for forming these PSA layers 2A and 2B can also be the same or different from each other. Usually, an embodiment in which the PSA layers 2A and 2B are formed from the same PSA composition can be preferably chosen.

The technology disclosed herein can be characterized by that the non-woven fabric (substrate) used for constituting the double-sided PSA sheet has a specific thickness, bulk density and air permeability.

In particular, the thickness of the non-woven fabric substrate is within a range of about 15 μm to 70 μm (preferably about 15 μm to 35 μm, for instance about 20 μm to 30 μm). The bulk density of the non-woven fabric substrate is within a range of 0.3 to 0.6/cm³ (for instance about 0.35 to 0.55 g/cm³). The non-woven fabric substrate has an air permeability such that it exhibits an air resistance (Gurley) of about 0.7 sec to 2 sec (preferably 0.8 sec and 2 sec) when measured for 8 layers of the substrate. The air resistance can be about 1 sec to 2 sec.

Air resistance (Gurley) can be calculated from the time required for a certain amount of air to permeate through a test piece (here, a test piece composed of 8 layers of the non-woven fabric substrate) with typically a commercially available Gurley tester (preferably type B) in accordance with the Gurley method for determining air permeability prescribed under JIS P 8117:1998.

With a non-woven fabric substrate that meets the above-described requirements for the thickness, bulk density and air resistance, by the method where an aqueous dispersion-type PSA composition is applied directly to the non-woven fabric substrate (direct method), the non-woven fabric substrate can be prepared so as to be well-impregnated with a PSA layer having a good surface condition (highly smooth surface). A double-sided PSA sheet having a PSA layer of this sort can exhibit excellent adhesive properties. For instance, this double-sided PSA sheet may have properties of adhesiveness (peel strength), cohesive strength, contour-following ability (edge lift) and the like in a good balance at a high level.

With a non-woven fabric substrate having an air resistance much lower than the above range (which requires too short a time for a certain amount of air to permeate through the test piece), air bubbles are likely to form when the PSA composition applied to the non-woven fabric substrate is allowed to dry and the air bubbles tend to degrade the surface condition (smoothness) of the PSA layer. A PSA layer with a rough surface like this tends to exhibit lower adhesive performance (adhesive strength). On the other hand, with a non-woven fabric substrate having an air resistance too far greater than the above range, because it is harder for the PSA composition to penetrate (impregnate) the non-woven fabric substrate sufficiently, it tends to be hard to make the non-woven fabric substrate well-impregnated with a PSA layer. Insufficient impregnation is not preferred because it could lower the adhesive performance (especially contour-following ability). In cases where the thickness and/or bulk density of the non-woven fabric substrate are too large, due to the difficulty of the PSA composition to penetrate (impregnate) the non-wo-ven fabric substrate, a relatively large amount of gas tends to be trapped internally. The trapped gas trying to escape to the outside when the composition is dried creates air bubbles and the escaping gas leaves marks as dents thereby to degrade the surface condition of the PSA layer. Further, a non-woven fabric substrate with too small a bulk density tends to have a lower strength (tensile strength).

As for the non-woven fabric substrate used in the technology disclosed herein, of non-woven fabrics conventionally known or used in the field of double-sided PSA sheets or other non-woven fabrics, an appropriate fabric that satisfies the requirements of the thickness, bulk density and air resistance (Gurley) can be selected. For instance, can be used any of non-woven fabrics composed of natural fibers of wood pulp, cotton, hemp (e.g. Manila hemp) or the like; non-woven fabrics composed of chemical fibers (synthetic fibers) of a polyester, rayon, vinylon, acetate, polyvinyl-alcohol (PVA), polyamide, polyolefin, polyurethane or the like; non-woven fabrics composed of two or more kinds of different fibers; and the like. Not particularly limited to, but a non-woven fabric having a grammage of about 8 to 16 g/m² (for instance about 13 to 16 g/m²) can be preferably selected.

The non-woven fabric substrate can be prepared with various general additives for paper making. Examples of such additives include paper strength additives (including wet strength agents) such as polyacrylamide resin, polyamide-epichlorohydrin resin, polyamine-epichlorohyrin resin, polyamidopolyamine-epichlorohydrin resin, starch, PVA, galactomannan, and the like. By varying the kinds and amounts of these additives to be used, can be obtained a non-woven fabric having an air resistance, a bulk density and so on within the ranges specified above. This non-woven fabric may also be impregnated with a resin (binder) such as viscose, PVA, polyacrylamide and the like. The air resistance, bulk density and so on of the non-woven fabric can be adjusted by varying the degree of impregnation of the binder (kind and amount of the resin).

A preferred example of the non-woven fabric for this invention is composed primarily of wood pulp fibers (i.e., pulp obtained from wood). Non-woven fabrics composed of such fibers can meet the requirements for the thickness, bulk density and air resistance described above and further exhibit appropriate firmness (consistency). A non-woven fabric composed of such fibers can satisfy the requirements for the preferred thickness, bulk density and air resistance described above and exhibit a high tensile strength at the same time. For these reasons, a non-woven fabric composed primarily of wood pulp fibers is preferred as a component of the double-sided PSA sheet Any of softwood and hardwood pulps can be used as the wood pulp. The wood pulp content of the fibers constituting the non-woven fabric is typically about 50 mass % or greater, preferably about 70 mass % or greater, and more preferably about 85 mass % or greater. In a preferred embodiment of the invention disclosed herein, a non-woven fabric composed essentially of wood pulp fibers is used as the non-woven fabric substrate.

In the method disclosed herein, PSA layers are formed by applying the direct method to at least a first side of the non-woven fabric substrate. In particular, a PSA composition is directly applied (typically by coating) to the non-woven fabric substrate and the applied composition is allowed to dry. As for the PSA composition used in the direct method, can be selected an appropriate aqueous-dispersion type (typically emulsion-type) PSA composition in which a known polymer such as an acrylic polymer, a polyester, polyurethane, polyether, rubber, silicone-based polymer, polyamide, fluorinebased polymer or the like is dispersed in water. The solid content of the PSA composition can be about 30 to 70 mass % for instance. Usually, a PSA composition with a solid content at about 40 to 65 mass % (for example, about 45 to 55 mass %) can be preferably used.

The PSA composition (typically aqueous emulsion-type PSA composition) used in the above direct method is preferred to have a viscosity of about 2 to 20 Pa·s (5 to 15 Pa·s more preferred) when the viscosity is measured at 23° C. and 20 rpm with type-B viscometer. A PSA composition having such a fluidity (typically viscosity) forms a PSA layer with a better surface condition (highly smooth surface). The fluidity can be adjusted for instance with a known fluidity adjusting agent (thickener, leveling agent or the like).

The PSA composition can be applied using conventional coaters such as a gravure roll coater, reverse roll coater, kiss roll coater, dip roll coater, bar coater, knife coater, spray coater and the like. Though not particularly limited, the amount of PSA composition coating (the amount of coating per PSA layer on one face of non-woven fabric substrate) may be chosen so as to form a PSA layer of about 20 µm to 150 µm (typically about 40 µm to 100 µm) after dried (in other words, based on the solidified portion). The preferred minimum amount of coating may differ depending on the kind of non-woven fabric substrate used. Normally, an appropriate amount of coating is chosen so as to form a PSA layer that is about 0.5 to 10 times (preferably about 1 to 5 times) the thickness of the non-woven fabric substrate.

In terms of facilitating the cross-linking reaction and increasing the production efficiency, it is preferred to dry the PSA composition with heating. Though it depends on the nature of the material to be coated (here, non-woven fabric substrate), it is usually preferred to be dried at about 40° C. to 120° C. According to the technology disclosed herein, for instance, even when dried at a temperature of about 80° C. or higher (typically about 80 to 120° C.), a PSA layer with a smooth surface (fewer air bubble marks) can be formed. Selecting this drying temperature range is preferred in terms of increasing the production efficiency.

In the method disclosed herein, a PSA layer can be provided to a second side of the non-woven fabric substrate by direct method or a method other than direct method such as transfer method. In the transfer method, the PSA layer adhered (transferred) to the non-woven fabric substrate can be formed by applying (typically by coating) a PSA composition to a surface (release surface) of a releasable support substrate (release liner or the like) and allowing it to dry or solidify. The PSA composition can be in various forms such as aqueous dispersion-type, solvent type, photo-curable and the like. Of these, an aqueous dispersion-type (typically aqueous emulsion-type) PSA composition can be preferably used. For example, any aqueous dispersion-type PSA composition having a composition and properties (solid content, viscosity, TI value etc.) discussed above as preferred for direct method can be appropriately used in transfer method. The same conditions used in direct method, in which a PSA composition is applied to the non-woven fabric substrate and allowed to dry, can be applied here as the conditions for coating and drying of the composition (applied amount, coating method and the like)

A preferred embodiment of the method for producing the double-sided PSA sheet disclosed herein will be explained here with reference to the schematic illustration shown in FIG. 3.

Figure 3:
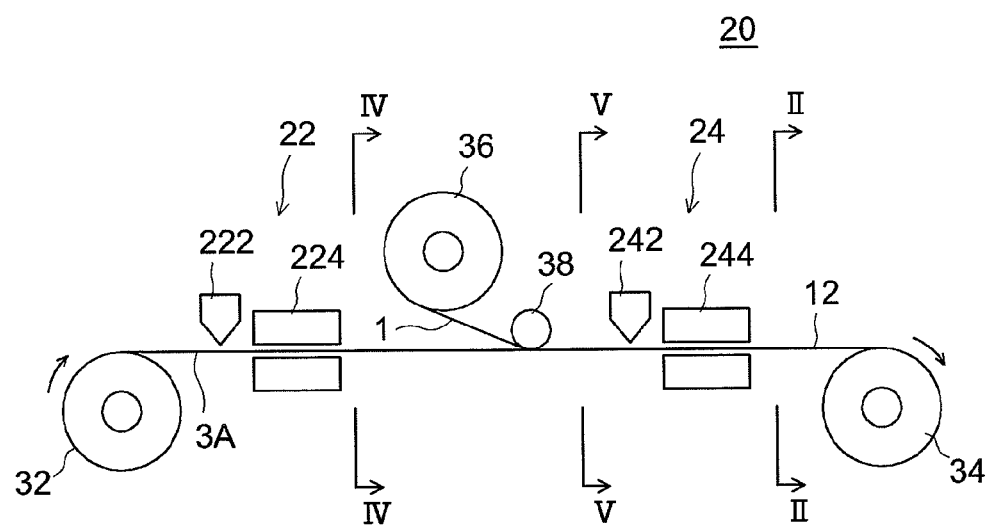
FIG. 3 shows a diagram schematically illustrating an embodiment of the method for producing the double-sided PSA sheet.

FIG. 3 shows a double-sided PSA sheet making apparatus 20 comprising a first coating section 22 and a second coating section 24; winding rollers 32, 34 to forward a release liner 3A through the coating sections 22 and 24; and a substrate roller 36 to provide a non-woven fabric substrate 1 to the release liner 3A moving from the first coating section 22 toward the second coating section 24.

Figure 4:
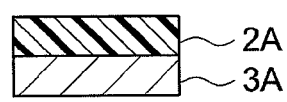
FIG. 4 shows a cross-section along the line IV-IV in FIG. 3.

The release liner 3A unrolled from the winding roller 32 is transferred to the first coating section 22. This first coating section 22, in the order from the start (left in the drawing), comprises a coater (for instance, a reverse roll coater) 222 to apply a PSA composition to the release liner 3A and a drier (for instance, a heated air drier) 224 to dry the applied composition. As passing through the first coating section 22 of such construction, a PSA layer 2A is formed on the surface (upper surface in FIG. 3) of the release liner 3A (refer to FIG. 4 showing the cross section along line IV-IV of FIG. 3).

Subsequently, the non-woven fabric substrate 1 is unrolled from the substrate roller 36 along with the PSA layer 2A formed on the release liner 3A and a first side of the non-woven fabric substrate 1 is adhered to the PSA layer 2A by a press roller 38. The PSA layer 2A is formed on the first side of the non-woven fabric substrate 1 (transfer method) this way.

Figure 5:
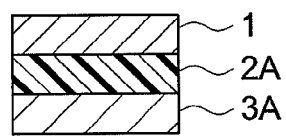
FIG. 5 shows a cross-section along the line V-V in FIG. 3.

The release liner 3A laminated with the PSA layer 2A and non-woven fabric substrate 1 (refer to FIG. 5 showing the cross section along line V-V in FIG. 3) is then transferred to the second coating section 24. The second coating section 24, in the order from the start (left in the drawing), comprises a coater (for instance, a reverse roll coater) 242 to apply a PSA composition to a second side of the non-woven fabric substrate 1 (the back side of the face adhered to the PSA layer 2A, i.e., the upper face in FIG. 3) and a drier (for instance, a heated air drier) 244 to dry the applied composition. The second coating section 24 of such construction provides a PSA layer 2B to the second side of the non-woven fabric substrate 1 (direct method).

Accordingly, a double-sided PSA sheet 12 (refer to FIG. 2 showing the II-II cross section in FIG. 3) is produced with the PSA layer 2A formed by transfer method (protected by the release liner 3A, which has been used for the transfer of the PSA layer) on the first side of the non-woven fabric substrate 1; and the PSA layer 2B formed by direct method on the second side thereof. This double-sided PSA sheet 12 is wound up by the roller 34.

In this embodiment, the release liner 3A can be wound forward from the roller 32 to the roller 34 thereby to form the double-sided PSA sheet 12. As described above, the double-sided PSA sheet 12 can be prepared continuously without the need for winding up once and rewinding the sheet on the way (in other words, prepared in a single pass), giving rise to a great productivity. In addition, because the release liner 3A used as a transfer substrate for the PSA layer 2A in the production process is in turn utilized as a component of the product (double-sided PSA sheet 12) and the PSA layer 2B is formed by direct method, an extra transfer substrate (used only in the production process) is not required. Therefore, production costs and waste amounts can be reduced.

An example of the PSA composition preferred in the technology disclosed herein takes the form of an aqueous emulsion primarily composed of an acrylic polymer (that is to say that the acrylic polymer amounts to be over 50 mass % of the non-volatiles (the solid content) contained in the PSA composition) dispersed in water.

The acrylic polymer may be a polymer obtained by polymerizing (typically by emulsion polymerization) a monomer raw material having an alkyl(meth)acrylate, i.e. a (meth) acrylic acid ester of an alkyl alcohol, as the primary monomer (principal monomer component). The alkyl(meth)acrylate comprised in this monomer raw material is preferably a (meth)acrylic acid ester of an alkyl alcohol with 2 to 20 (more preferably 4 to 10) carbon atoms. Specific examples of the alkyl group in this alkyl alcohol include the ethyl, propyl, isopropyl, butyl, isobutyl, pentyl, isopentyl, hexyl, heptyl, 2-ethylhexyl, isooctyl, isononyl, isodecyl and the like. Particularly desirable examples of the alkyl(meth)acrylate include butyl(meth)acrylate and 2-ethylhexyl(meth)acrylate.

In addition to the alkyl(meth)acrylate as the primary monomer, the monomer raw material may also contain other monomers (copolymer components) as optional components. These "other monomers" may be of one or two or more kinds selected from various monomers that are copolymerizable with the alkyl(meth)acrylate used here. For example, can be used an ethylenic unsaturated monomer having one or two or more functional groups selected from the carboxyl, hydroxyl, amino, amido, epoxy, alkoxysilyl and the like (functional group-containing monomer). Of these, it is desirable to use acrylic acid and/or methacrylic acid. This functional group-containing monomer is used as a constituent of the monomer raw material together with the alkyl(meth)acrylate, which is the primary monomer, and can serve to introduce crosslinking points into the acrylic polymer obtained from the monomer raw material. The type and proportion (copolymer percentage) of the functional group-containing monomer can be chosen appropriately according to the type and amount of the crosslinking agent used, the type of the crosslinking reaction, the desired degree of crosslinking (crosslinking density) and the like.

The aqueous-dispersion type PSA composition can be obtained by subjecting the monomer raw material to emulsion polymerization. The embodiment of the emulsion polymerization is not particularly limited, and for example various monomer supplying methods, polymerization conditions (temperature, time, pressure and the like), and materials (polymerization initiator, surfactant and the like) can be employed similarly to the conventional emulsion polymerization. For example, the monomer raw material can be supplied all at once, gradually (dropwise) or portionwise, etc. All or part of the monomer raw material may also be mixed and emulsified with water in advance, and the resulting emulsion can then be supplied to the reaction vessel.

Polymerization can be carried out, for example, at about 20 to 100° C. (typically 40 to 80° C.). Examples of polymerization initiators include azo initiators, peroxide initiators, redox initiators and the like, but are not limited to these. Polymerization initiator can be used for example in the amount of about 0.005 to 1 part by mass per 100 parts by mass of the monomer raw material.

As for the emulsifier (surfactant), an anionic emulsifier can be used such as sodium lauryl sulfate, ammonium lauryl sulfate, sodium dodecyl benzene sulfonate, or sodium polyoxyethylene lauryl sulfate or a nonionic emulsifier can be used such as polyoxyethylene alkylether, polyoxyethylene alkylphenylether or the like, for example. These emulsifiers may be used alone or in combination of two or more. The emulsifier can be used for example in the amount of about 0.2 to 10 parts by mass (preferably about 0.5 to 5 parts by mass) per 100 parts by mass of the monomer raw material.

Various conventionally known chain transfer agents (which can also be seen as molecular weight adjusters or polymerization degree adjusters) can be used as necessary in the polymerization. One or two or more such chain transfer agents may be selected from dodecyl mercaptan (dodecanethiol), glycidyl mercaptan, 2-mercaptoethanol and other mercaptans for example. Of these, dodecanethiol is preferably used. The chain transfer agent can be used for example in the amount of about 0.001 to 0.5 parts by mass per 100 parts by mass of the monomer raw material. It can also be used in the amount of about 0.02 to 0.05 parts by mass.

Although this is not a limitation, the emulsion polymerization can be carried out so that the amount of the insoluble matter (gel fraction) remaining after ethyl acetate extactions of the resulting acrylic polymer is 0 mass % or greater, but less than 15 mass %. It can also be performed so that the mass-average molecular weight (Mw) of the tetrahydrofuran (THF)-soluble matter of the acrylic polymer is about $50 \times 10^4$ to $100 \times 10^4$, for example, based on standard polystyrene.

A crosslinking agent can be compounded as necessary in the PSA composition (preferably an aqueous-emulsion type acrylic PSA composition) used in the method disclosed herein. The crosslinking agent can be any one selected from conventional crosslinking agents such as the carbodiimide crosslinking agents, hydrazine crosslinking agents, epoxy crosslinking agents, isocyanate crosslinking agents, oxazoline crosslinking agents, aziridine crosslinking agents, metal chelate crosslinking agents, silane coupling agents and the like. These can be used alone or in combination of two or more. The amount of the crosslinking agent to be used is not particularly limited, but is generally chosen so that the amount of the insoluble matter (the gel fraction) remaining after ethyl acetate extractions of the PSA that has been formed of the composition (that is, the PSA after crosslinking with the aforementioned crosslinking agent) is about 15 to 70 mass % (for instance, 30 to 55 mass %).

A tackifier may also be compounded in the PSA composition. One or two or more tackifying resins selected from the rosin resins, rosin derivative resins, petroleum resins, terpene resins, phenol resins, ketone resins and other tackifying resins can be used as the tackifier. The compounded amount of the tackifier can generally be for example about 50 parts by mass or less based on the solid content (nonvolatile content) per 100 parts by mass of the polymer component (for example, acrylic polymer in the case of an aqueous emulsion-type acrylic PSA composition). Normally, a suitable compounded amount is about 30 parts by mass or less. There is no particular lower limit on the tackifier content, but normally good effects are obtained when it is at least 1 part by mass with respect to 100 parts by mass of the polymer component.

A preferred tackifier has a softening point of for example about 140° C. or higher (typically 140 to 180° C.) in order to increase the cohesive strength in high-temperature environments. Examples of tackifiers having such a softening point include those available from Arakawa Chemical Industries under the trade names "Super Ester E-865", "Super Ester E-865NT", "Super Ester E-650", "Super Ester E-786-60", "Tamanol E-100", "Tamanol E-200", "Tamanol 803L", "Pensel D-160" and "Pensel KK"; and those available from Yasuhara Chemical under the trade names "YS Polystar S", "YS Polystar T", "Mighty Ace G" and the like, but are not limited to these. These tackifier may be used alone or in combination of two or more. It is desirable that the tackifier be in the form of an aqueous dispersion (tackifier emulsion), and that the tackifier emulsion contain essentially no organic solvent.

The PSA composition may also contain an acid or a base (ammonia water or the like), for example, to adjust the pH. Other optional components that can be contained in the composition include viscosity adjuster, leveling agent, plasticizer, filler, pigment, dye and other colorants, stabilizer, preservative, antioxidant and various other additives that are commonly used in the field of aqueous PSA compositions. A conventional wetting agent can also be added to the PSA composition to increase the ability of the PSA to impregnate the non-woven fabric substrate. Addition of a wetting agent is particularly effective when the PSA layer is formed by direct method on at least one side of the non-woven fabric substrate. These various known additives may be used by ordinary methods, and since they are not particular features of the present invention they are not explained in detail.

A double-sided PSA sheet produced by the method disclosed herein comprises a PSA layer formed by direct method and the surface (adhesive face) of the PSA layer may be, for instance, essentially free of macro-scale dents caused by air bubbles when stored at 50° C. over three days after prepared. Typical examples of the macro-scale dents caused by air bubbles are air bubble marks as described above (typically, each having a roughly semi-globular opening). The double-sided PSA sheet disclosed herein (which may be produced by the method disclosed herein), for example, comprises an adhesive face prepared by direct method, the adhesive face having fewer than four dents per 1 $mm^2$ when observed after the storage period under scanning electron microscope at a magnification of 100 times. A double-sided PSA sheet such as this having an adhesive face with no or only a few macro-scale dents (i.e., having a highly smooth surface) may exhibit better adhesive performance. In addition, because of the smooth adhesive face, it has a great external appearance as well (for instance, appearance of the exposed adhesive face when applied).

In a preferred embodiment of the double-sided PSA sheet disclosed herein, the non-woven fabric substrate is well impregnated with PSA layers provided on the first and second sides. For example, the double-sided PSA sheet preferably has an empty area of 750 $\mu m^2$/400 $\mu m$ or smaller (more preferably, about 500 $\mu m^2$/400 $\mu m$ or smaller). A double-sided PSA sheet of this sort can exhibit greater adhesive performance (for instance, contour-following ability evaluated by edge lift measurement or the like). The method disclosed herein is thus desirable as a method for producing a double-sided PSA sheet well-impregnated with a PSA layer.

In this Specification, the "empty area" is defined as, in a cross-section cut in the direction of thickness of the double-sided PSA sheet (vertical cross-section) along a line perpendicular to the machine direction of the non-woven fabric substrate making up the double-sided PSA sheet (MD direction, typically the lengthwise direction of the sheet), the amount of empty areas (open areas in the cross-section) observed per 400 $\mu m$ of the length of the cross-section (typically measured along with the width direction of the non-woven fabric substrate). The empty areas can be analyzed from an image of the cross section obtained by scanning electron microscopy (SEM) at a magnification of 100× to 1000× (300× for example). A sample for SEM analysis can be prepared by ordinary methods and, for instance, the preparation methods as described in the examples below can be preferably employed. The same applies to the SEM settings (measurement conditions) and means to analyze the SEM image. Preferably, the amount of empty areas is determined by analyzing at least three (more preferably 5 or more, such as 5 to 10) different cross-sections along cutting lines varied in the machine direction of the non-woven fabric substrate and taking an average of the values.

EXAMPLES

Some examples of the present invention are explained here, but it is not intended that the present invention be limited by these examples. When not otherwise specified, the terms "part" and "%" in the following explanation are based on mass.

The air permeability of a non-woven fabric substrate used below was evaluated by measuring an air resistance (Gurley) in the following fashion. A test piece of about 50 mm×50 mm square was prepared from 8 layers of each non-woven fabric substrate. The test piece was placed in a commercially-available type-B Gurley tester (test area of 645 $mm^2$) and the amount of time required for a 100 mL of air to pass through the test piece was measured following the Gurley test protocols prescribed under JIS P 8117:1998. The testing was carried out with 5 test pieces for each non-woven fabric substrate and their average was taken as the air resistance (sec) of the test piece.

Example 1

In a reaction vessel equipped with a cooling tube, nitrogen inlet, thermometer and stirring machine, were placed 0.1 part 2,2'-azobis[N-(2-carboxyethyl)-2-methylpropionamidine] hydrate (polymerization initiator trade name "VA-057" available from Wako Pure Chemical Industries) and 35 parts ion-exchanged water, and the reaction mixture was stirred under nitrogen flow for 1 hour. The mixture was maintained at 60° C. An emulsion (monomer raw material emulsion) was prepared by adding 30 parts butyl acrylate (BA), 70 parts 2-thylhexyl acrylate, 4 parts acrylic acid, 0.02 parts 3-methacryloxypropyltrimethoxysilane (trade name "KBM-503" available from Shin-Etsu Chemical Co., Ltd.), 0.033 parts dodecanethiol (chain transfer agent) and 2 parts sodium polyoxyethylene lauryl sulfate (emulsifier) to 40 parts ion-exchanged water and emulsifying. This emulsion was added dropwise over 3 hours to the reaction mixture maintained at 60° C. to promote emulsion polymerization reaction. After the addition of the monomer raw material emulsion, the reaction mixture was stored at the same temperature for additional 3 hours. To the mixture was added 10% ammonia water to adjust the pH to 7.5 and an emulsion of the acrylic polymer was obtained.

The mass-average Molecular weight (Mw) of the THF-soluble portion of the acrylic polymer after THF extractions was 86.8×$10^4$ (based on standard polystyrene). The mass percentage of the ethyl acetate-insoluble portion of the acrylic polymer was 40.8%.

For 100 parts of the acrylic polymer contained in this emulsion, was added a tackifier emulsion (trade name "Super Ester E-865NT", aqueous dispersion of polymerized rosin resin with a softening point of 160° C., available from Arakawa Chemical Industries) in the amount of 20 parts (based on solid content) to obtain the PSA composition for Example 1. It is noted that the viscosity of this PSA composition was adjusted to 10 Pa·s by addition of a general thickener.

As for the substrate of the double-sided PSA sheet a non-woven fabric was obtained. In this Example, was used as the substrate a non-woven fabric of 28 $\mu m$ in thickness, 0.50 g/$cm^3$ in bulk density and 14 g/$m^2$ in grammage, which is composed essentially of wood pulp (available from Nippon Daishowa Paperboard Co., Ltd.). The air resistance of the non-woven fabric substrate measured as described above (hereinafter, may be referred to simply as the "air resistance of the non-woven fabric substrate") was 1.47 sec.

Using the above PSA composition, PSA layers were provided to a first side of the non-woven fabric substrate by transfer method and to a second side by direct method.

In particular, the PSA composition was applied to a release liner obtained by treating a sheet of high-quality paper with a silicone release agent. This was allowed to dry at 100° C. for 2 minutes to form a PSA layer of 60 $\mu m$ thickness on the liner.

This release liner with a PSA layer was adhered on the first side of the non-woven fabric substrate thereby to provide a PSA layer to the first side by transfer method. After this adhering step, the liner (transferring substrate) was used as-is for protection of the PSA layer.

The second side of the non-woven fabric substrate was coated with the PSA composition in an amount to produce a layer of 60 μm thickness after dried. This was dried at 100° C. for 3 minutes thereby to provide a PSA layer on the second side by direct method. A release liner different from the transferring substrate was laminated on this PSA layer to obtain the double-sided PSA sheet of Example 1.

Example 2

In this Example, was used as the substrate a non-woven fabric of 30 μm in thickness, 0.37 g/cm$^3$ in bulk density and 11 gm/$^2$ in grammage, which is composed essentially of wood pulp (available from Daifuku Paper Manufacturing Co., Ltd.). The air resistance of this non-woven fabric substrate was 0.80 sec. Except for these differences, a double-sided PSA sheet was obtained in the same way as Example 1.

Example 3

A double-sided PSA sheet was obtained in the same manner as Example 1 except that as the substrate was used a non-woven polyester fabric of 20 μm in thickness, 0.49 g/cm$^3$ in bulk density and 9.8 g/m$^2$ in grammage (available from Nippon Daishowa Paperboard Co., Ltd.). The air resistance of this non-woven fabric substrate was 0.82 sec.

Example 4

A double-sided PSA sheet was obtained in the same manner as Example 1 except that as the substrate was used a non-woven fabric of 28 μm in thickness, 0.50 g/cm$^3$ in bulk density and 14 g/m$^2$ in grammage, which is composed essentially of wood pulp (available from Nippon Daishowa Paperboard Co., Ltd.). The air resistance of this non-woven fabric substrate was 3.56 sec.

Example 5

A double-sided PSA sheet was obtained in the same manner as Example 1 except that as the substrate was used a non-woven hemp fabric of 39 μm in thickness, 0.32 g/cm$^3$ in bulk density and 12.4 g/m$^2$ in grammage (available from Nippon Daishowa Paperboard Co., Ltd.). The air resistance of this non-woven fabric substrate was 0.15 sec.

Example 6

A double-sided PSA sheet was obtained in the same manner as Example 1 except that as the substrate was used a non-woven fabric of 33 μm in thickness, 0.43 g/cm$^3$ in bulk density and 14.2 g/m$^2$ in grammage, which is composed essentially of wood pulp (available from Nippon Daishowa Paperboard Co., Ltd.). The air resistance of this non-woven fabric substrate was 0.60 sec.

Example 7

A double-sided PSA sheet was obtained in the same manner as Example 1 except that as the substrate was used a non-woven fabric of 42 μm in thickness, 0.33 g/cm$^3$ in bulk density and 14 g/m$^2$ in grammage, which is composed essentially of wood pulp (available from Daifuku Paper Manufacturing Co., Ltd.). The air resistance of this non-woven fabric substrate was 0.30 sec.

Example 8

A double-sided PSA sheet was obtained in the same manner as Example 1 except that as the substrate was used a non-woven polyester fabric of 60 μm in thickness, 0.25 g/cm$^3$ in bulk density and 14.9 g/m$^2$ in grammage (available from Nippon Daishowa Paperboard Co., Ltd.). The air resistance of this non-woven fabric substrate was 0.11 sec.

Example 9

A double-sided PSA sheet was obtained in the same manner as Example 1 except that as the substrate was used a non-woven polyester fabric of 36 μm in thickness, 0.39 g/cm$^3$ in bulk density and 14.1 g/m$^2$ in grammage, which is composed of wood pulp, rayon and vinylon (available from Nippon Daishowa Paperboard Co., Ltd.). The air resistance of this non-woven fabric substrate was 0.42 sec.

Example 10

A double-sided PSA sheet was obtained in the same manner as Example 1 except that as the substrate was used a non-woven polyester fabric of 32 μm in thickness, 0.33 g/cm$^3$ in bulk density and 10.6 g/m$^2$ in grammage, which is composed of wood pulp, rayon and vinylon (available from Nippon Daisbowa Paperboard Co., Ltd.). The air resistance of this non-woven fabric substrate was 0.15 sec.

Example 11

A double-sided PSA sheet was obtained in the same manner as Example 1 except that as the substrate was used a non-woven polyester fabric of 30 μm in thickness, 0.31 g/cm$^3$ in bulk density and 9.4 g/m$^2$ in grammage, which is composed of wood pulp, hemp, polyester and vinylon (available from Nippon Daisbowa Paperboard Co., Ltd.). The air resistance of this non-woven fabric substrate was 0.21 sec.

The double-sided PSA sheets obtained for Examples 1 to 11 were stored at 50° C. for 3 days after produced. The surfaces of the PSA layers formed by direct method were observed under Scanning Electron Microscopy (SEM) at 100× and their surface conditions were evaluated on a scale of 1 to 3 as follows:

1: the number of dents caused by bubbles is fewer than 4 per 1 mm$^2$
2: the number of dents is 4 to 9 per 1 mm$^2$
3: the number of dents is 10 or more per 1 mm$^2$.

After stored at 50° C. for 3 days from the produced date, each of the double-sided PSA sheets of Examples 1 to 5 was cut along a line perpendicular to the machine direction of the non-woven fabric substrate constituting the sheet and steam-dyed at 50° C. for 5 hours with a 4% aqueous osmium (Os) solution. A sample was cut out with a microtome, fixed to a sample stand with a piece of conductive adhesive tape, and subjected to Pt—Pd sputtering for 20 seconds. The cross-section of the sample prepared in this way was observed under the following conditions.

Equipment: Hitachi High-Technologies field emission scanning electron microscope, Model No. S-4800;

Measurement conditions: Secondary electron image observed at an acceleration voltage of 3 kV (300× magnification).

The obtained SEM image was analyzed with a commercial image analysis software (trade name "A-zo-kun" from Asahi Kasei Engineering) to determine the amount of empty area observed per 400 μm of length of the sample cross-section ($μm^2/400$ μm). It is noted that the analysis mode of the image analysis software was set at "particle analysis". In order to set up the analysis conditions, while observing the individual SEM image, threshold values to distinguish empty areas from other areas were selected so as to properly identify those parts that were indeed empty. Parts that were obviously different from the empty areas subject to this measurement (the subject areas illustrating the degree of impregnation of the non-woven fabric), such as cracks occurring in the adhesive layers during preparation of the sample for observation, were not included when calculating the amount of empty areas. The amount of empty areas were measured for three different cross-sections (n=3) along cutting lines varied in the machine direction of the non-woven fabric substrate and the average of these was taken as the amount of empty areas of the double-sided PSA sheet.

In addition, the mass percentage of ethyl acetate-insoluble portion of the PSA samples removed from these PSA sheets after the 3-day storage at 50° C. was 41.3%.

The results are shown in Tables 1 and 2 along with the component(s) and properties (thickness, bulk density, air resistance, tensile strength) of the non-woven fabric substrates used.

The tensile strength was measured for each non-woven fabric as follows: a first test piece of each sample was prepared by cutting the non-woven fabric substrate into a strip of 15 mm width in such a way that the machine direction (MD) of the substrate aligned with the length of the strip. The first test piece was stretched using a tensile tester at a chuck distance of 100 mm and a pulling speed of 300 mm/min and the ultimate (maximum) strength was measured in N/15 mm to determine the tensile strength of the non-woven fabric in the MD (flow direction). A second test piece of each sample was prepared by cutting the non-woven fabric into a strip of 15-mm width in such a way that the cross-machine direction (CD) of the substrate aligned with the length of the strip. The ultimate strength of the second test piece was measured in N/15 mm under the same conditions to determine the tensile strength of the no-woven fabric in the CD (width direction).

As shown in Tables 1 and 2, the double-sided PSA sheets of Examples 1 to 3; each prepared with a non-woven fabric substrate of 15 μm to 70 μm in thickness (more specifically 20 μm to 30 μm), 0.3 to 0.6 $g/cm^3$ in bulk density (more specifically 0.35 to 0.5 $g/cm^3$) and 0.7 sec to 2 sec in air resistance (Gurley) (more specifically 0.8 sec to 1.5 sec); all showed minimal formation of air bubbles when the PSA composition applied to their non-woven fabric substrates was dried, thereby allowing to form highly smooth adhesive faces (surfaces of PSA layers formed by direct method). With respect to any of these double-sided PSA sheets of Example 1 to 3, the non-woven fabric (substrate) was well-impregnated with a PSA layer (that is, the amount of empty areas is 500 μm/400 μm or smaller). Especially, the double-sided PSA sheet of Example 1 having a non-woven fabric composed of wood pulp exhibited proper firmness and great strength (tensile strength).

On the contrary, the double-sided PSA sheet of Example 4 having a non-woven fabric substrate similar to Example 1 in the fiber component, thickness and bulk density, but too large in air resistance (i.e., too low in permeability) had a less smooth adhesive face as compared to Example 1 and the degree of impregnation with the PSA layer was low as well. This is attributed to the non-woven fabric substrate of Example 4, which was more resistant toward the penetration of the applied PSA composition and thus a large amount of air was trapped in the non-woven fabric substrate to form air bubbles upon drying and degrade the surface condition of the PSA layer. On the other band, the double-sided PSA sheets of Examples 5 to 11 each having a non-woven fabric substrate with too small an air resistance (i.e., too great a permeability) were less smooth on the adhesive faces formed by direct method. These results indicate that the air resistance of the non-woven fabric substrate used, whether too high or too low, causes to reduce the smoothness of the adhesive face and thus to achieve the objectives of the present invention, a non-woven fabric substrate having an air resistance within a prescribed range is required.

As explained above, with the method of the present invention for producing a double-sided PSA sheet, it is possible to obtain a double-sided PSA sheet having a PSA layer of good (smooth) surface condition formed by direct method. The use of direct method leads to achievement of reduced production costs, reduced waste amounts and increased productivity. In addition, the double-sided PSA sheet of the present invention is highly smooth on the adhesive face formed by direct method. A PSA sheet of this sort can exhibit excellent adhesive properties. Because of these properties, this double-sided PSA sheet can be used favorably as a double-sided PSA sheet for fixing automobile interior parts or the like.

TABLE 1

| | Example | | | | |
|---|---|---|---|---|---|
| | 1 | 2 | 3 | 4 | 5 |
| Thickness (μm) | 28 | 30 | 20 | 28 | 39 |
| Bulk density (g/cm³) | 0.50 | 0.37 | 0.49 | 0.50 | 0.32 |
| Air resistance (seconds) | 1.47 | 0.80 | 0.82 | 3.56 | 0.15 |
| Tensile strength    MD | 15.7 | 8.8 | 7.5 | 15.2 | 11.8 |
| (N/15 mm)    CD | 4.5 | 1.5 | 1.6 | 4.1 | 5.5 |
| Surface condition | 1 | 1 | 1 | 2 | 3 |
| Empty area (μm²/400 μm) | ≤500 | ≤500 | ≤500 | >500 | ≤500 |

TABLE 2

| | Example | | | | | |
|---|---|---|---|---|---|---|
| | 6 | 7 | 8 | 9 | 10 | 11 |
| Thickness (μm) | 33 | 42 | 60 | 36 | 32 | 30 |
| Bulk density (g/cm³) | 0.43 | 0.33 | 0.25 | 0.39 | 0.33 | 0.31 |
| Air resistance (seconds) | 0.60 | 0.30 | 0.11 | 0.42 | 0.15 | 0.21 |
| Tensile strength    MD | 12.2 | 8.4 | 10.3 | 10.2 | 5.9 | 7.7 |
| (N/15 mm)    CD | 2.1 | 2.2 | 1.6 | 2.0 | 1.4 | 1.8 |
| Surface condition | 3 | 3 | 3 | 3 | 3 | 3 |

What is claimed is:

1. A double-sided PSA sheet produced by a method comprising
   (a) preparing an aqueous dispersion-type PSA composition;
   (b) preparing a non-woven fabric substrate that is 15 μm to 70 μm in thickness and 0.3 to 0.6 g/cm³ in bulk density, wherein 8 layers of the non-woven fabric substrate have an air resistance of 0.7 sec to 2 sec (Gurley); and
   (c) forming a PSA layer by applying the PSA composition to at least one of the two sides of the non-woven fabric substrate and allowing the applied composition to dry.

2. A double-sided PSA sheet, comprising:
   (a) a non-woven fabric substrate that is 15 μm to 70 μin thickness and 0.3 to 0.6 g/cm³ in bulk density, wherein 8 layers of the non-woven fabric substrate have an air resistance of 0.7 sec to 2 sec (Gurley); and
   (b) a PSA layer formed by applying an aqueous dispersion-type PSA composition to the non-woven fabric substrate and allowing the applied composition to dry, wherein the PSA layer has a surface essentially free of macro-scale dents caused by air bubbles.

3. The sheet of claim 2, wherein the non-woven fabric substrate is composed primarily of wood pulp fibers.

4. The sheet of claim 2, wherein the PSA composition is an aqueous emulsion-type PSA composition comprising an acrylic polymer as a main component dispersed in water.

5. The sheet of claim 2, wherein the non-woven fabric substrate has a grammage of 8 to 16 g/m².

6. The sheet of claim 2, wherein the surface of the PSA layer has fewer than four dents per 1 mm² when observed under a scanning electron microscope after storage at 50° C. for three days.

7. The sheet of claim 2, wherein the non-woven fabric substrate is impregnated with the PSA layer so as to have an empty area of 750 μm² or smaller per 400 μm length of vertical cross-section along a line perpendicular to a machine direction of the non-woven fabric substrate.

* * * * *